United States Patent
Li et al.

(10) Patent No.: US 12,295,034 B2
(45) Date of Patent: May 6, 2025

(54) INFORMATION INDICATING METHOD, DEVICE AND SYSTEM

(71) Applicant: VIVO MOBILE COMMUNICATION CO., LTD., Dongguan (CN)

(72) Inventors: Can Li, Dongguan (CN); Xiaodong Shen, Dongguan (CN); Rakesh Tamrakar, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 502 days.

(21) Appl. No.: 17/700,372

(22) Filed: Mar. 21, 2022

(65) Prior Publication Data

US 2022/0217776 A1 Jul. 7, 2022

Related U.S. Application Data

(63) Continuation of application No. PCT/CN2020/116494, filed on Sep. 21, 2020.

(30) Foreign Application Priority Data

Sep. 25, 2019 (CN) .......................... 201910914131.3

(51) Int. Cl.
*H04W 74/00* (2009.01)
*H04W 74/08* (2024.01)
*H04W 74/0816* (2024.01)

(52) U.S. Cl.
CPC ..... *H04W 74/0816* (2013.01); *H04W 74/004* (2013.01); *H04W 74/0875* (2013.01)

(58) Field of Classification Search
None
See application file for complete search history.

(56) References Cited

U.S. PATENT DOCUMENTS

2022/0070923 A1* 3/2022 Li .................... H04W 74/0808
2022/0116152 A1* 4/2022 Iyer .......................... H04L 1/188

FOREIGN PATENT DOCUMENTS

| CN | 108366431 A | 8/2018 |
| CN | 109417792 A | 3/2019 |
| CN | 111193582 A | 5/2020 |

(Continued)

OTHER PUBLICATIONS

International Search Report issued in corresponding International Application No. PCT/CN2020/116494 mailed Dec. 21, 2020, 6 pages.

(Continued)

*Primary Examiner* — Hong Shao
(74) *Attorney, Agent, or Firm* — IPX PLLC

(57) ABSTRACT

Embodiments of the present application discloses an information indicating method, a device and a system. The method includes: sending a physical uplink shared channel (PUSCH), wherein the PUSCH bears uplink control information (UCI), the UCI is used to indicate at least one of the following: remaining MCOT information which is used to indicate a remaining maximum channel occupancy time (MCOT) of a channel occupancy time (COT) within which a user equipment (UE) performs uplink transmission, or a target time period. The target time period includes: a time period for allowing a network device to transmit downlink data within COT within which uplink transmission is performed.

20 Claims, 4 Drawing Sheets

(56) References Cited

FOREIGN PATENT DOCUMENTS

WO  2018184022 A1 10/2018
WO  2019038701 A1 2/2019

OTHER PUBLICATIONS

Ericsson, "on AUL Configuration and Activation", 3GPP TSG-RAN WG1 Meeting #91 R1-1720372, Dec. 1, 2017.
Ericsson, "on AUL Channel Access", 3GPP TSG-RAN WG1 Meeting #91 R1-1720374, Dec. 1, 2017.
Ericsson, "Configured grant enhancement", 3GPP TSG-RAN WG1 Meeting #97 R1-1907457, May 17, 2019.
First Office Action issued in related Chinese Application No. 201910914131.3, mailed Feb. 8, 2022, 9 pages.
Vivo, "Feature lead summary on Configured grant enhancement", 3GPP TSG-RAN WG1 Meeting #98 R1-1909476, Aug. 2019.

* cited by examiner

INFORMATION INDICATING METHOD, DEVICE AND SYSTEM

CROSS-REFERENCE TO RELATED APPLICATIONS

This application is a continuation of International Application No. PCT/CN2020/116494, filed on Sep. 21, 2020, which claims priority to Chinese Patent Application No. 201910914131.3, filed on Sep. 25, 2019, both of which are incorporated herein by reference in their entireties.

TECHNICAL FIELD

Embodiments of the present application relate to the technical field of communication, and in particular, to an information indicating method, a device and a system.

BACKGROUND

In an unlicensed frequency band of New Radio (NR), before sending data, User Equipment (UE) or a network device needs to perform Clear Channel Assess (CCA)/extended Clear Channel Assess (eCCA) to listen a channel, that is, to perform Energy Detection (ED). When the energy is lower than a certain threshold, the channel is determined to be idle, and data transmission can be started. Because the unlicensed frequency band is shared by a plurality of technologies or a plurality of transmission nodes, this contention-based access manner leads to uncertainty of a channel available time. At present, there are three types of Listen Before Talk (LBT) for NR unlicensed communication: LBT Cat 1: it can be directly sent without any CAA and must be used in a case that a channel has been already acquired and the transmission conversion interval is less than 16 us; LBT Cat 2: performs 25 us channel listening and may be used for a specific signal to acquire a channel, wherein the maximum continuous transmission length should be less than a certain value, for example, 1 ms; and LBT Cat 4: performs channel listening of fusion random backoff and may be set to be different for different priority class parameters, finally the maximum length which can be transmitted may be different after the channel is acquired.

The network device may share Channel Occupancy Time (COT) acquired by UE based on Configured Grant (CG) transmission, but there is no solution of how the network device shares the COT of UE for downlink data transmission at present, that is, how the network device shares the COT of UE for downlink data transmission has become a problem to be solved.

SUMMARY

Embodiments of the present application provide an information indicating method, a device and a system, which can solve the problem of how the network device shares the COT of UE for downlink data transmission.

According to a first aspect of the embodiments of the present application, an information indicating method is provided and applied to UE. The information indicating method includes: sending a Physical Uplink Shared CHannel (PUSCH), wherein the PUSCH bears Uplink Control Information (UCI), the UCI is used to indicate at least one of the following: remaining Maximum Channel Occupancy Time (MCOT) information which is used to indicate a remaining MCOT of a COT within which the UE performs uplink transmission, or a target time period, or the target time period is: a time period for allowing a network device to transmit downlink data within COT within which uplink transmission is.

According to a second aspect of the embodiments of the present application, an information indicating method is provided and applied to a network device. The Information method includes: receiving a PUSCH, wherein the PUSCH bears UCI, the UCI is used to indicate at least one of the following: remaining MCOT information which is used to indicate a remaining MCOT of a COT within which the UE performs uplink transmission, or a target time period, or the target time period is: a time period for allowing a network device to transmit downlink data within COT within which uplink transmission is.

According to a third aspect of the embodiments of the present application, UE is provided. The UE may include: a sending module. The sending module is configured to send a PUSCH, wherein the PUSCH bears UCI, the UCI is used to indicate at least one of the following: remaining MCOT information which is used to indicate a remaining MCOT of a COT within which the UE performs uplink transmission, or a target time period, and the target time period is: a time period for allowing a network device to transmit downlink data within COT within which uplink transmission is.

According to a fourth aspect of the embodiments of the present application, a network device is provided. The network device may include: a receiving. The receiving module is configured to receive a PUSCH, wherein the PUSCH bears UCI, the UCI is used to indicate at least one of the following: remaining MCOT information which is used to indicate a remaining MCOT of a COT within which the UE performs uplink transmission, or a target time period, and the target time period is: a time period for allowing a network device to transmit downlink data within COT within which uplink transmission is.

According to a fifth aspect of the embodiments of the present application, UE is provided. The UE includes a processor, a memory, and a computer program stored in the memory and capable of running on the processor, wherein the computer program is executed by the processor, the steps of the information indicating method according to the first aspect are implemented.

According to a sixth aspect of the embodiments of the present application, a network device is provided. The network device includes a processor, a memory, and a computer program stored in the memory and capable of running on the processor, wherein the computer program is executed by the processor, the steps of the information indicating method according to the second aspect are implemented.

According to a seventh aspect of the embodiments of the present application, a communication system is provided. The communication system includes the UE according to the third aspect and the network device according to the fourth aspect; or the communication system includes the UE according to the fifth aspect and the network device according to the sixth aspect.

According to an eighth aspect of the embodiments of the present application, a computer readable storage medium is provided. The computer readable storage medium stores a computer program; and when the computer program is executed by a processor, the steps of the information indicating method according to the first aspect are implemented, and the steps of the information indicating method according to the second aspect are implemented In the embodiments of the present application, the UE may send the PUSCH bearing the UCI to the network device so as to indicate remaining MCOT information which is used to indicate a remaining MCOT of a COT within which the UE performs uplink transmission and/or a target time period (that is, the time period allowing the network device to transmit downlink data within the COT within which the uplink transmission is) to the network device. The UE may indicate the remaining MCOT information and/or the target time period to the network device through the UCI, so that the network device may share the COT of the UE performing uplink transmission according to the remaining MCOT information and/or the target time period, thereby effectively transmitting downlink data.

DETAILED DESCRIPTION

Figure 1:
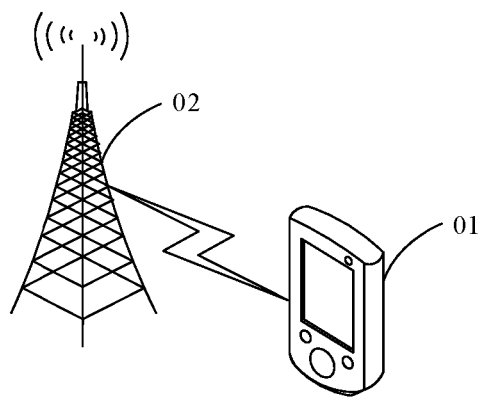
FIG. 1 is an architecture schematic diagram of a communication system according to an embodiment of the present application.

The technical solutions of the examples of the present application are clearly described below with reference to the accompanying drawings of the examples of the present application the described examples are some rather than all of the examples of the present application. All other embodiments obtained by a person of ordinary skill in the art based on the embodiments of the present application shall fall within the protection scope of the present application.

In the specification and claims of the embodiments of the present application, the terms such as "first" and "second" are used to distinguish between different objects, but are not used to describe a particular sequence of the objects. For example, first indication information and second indication information are intended to distinguish between different indication information, but do not describe a particular order of the indication information.

In the description of the embodiments of the present application, unless otherwise specified, the meaning of "a plurality of" means two or more. For example, multiple elements refer to two elements or more than two elements.

The term "and/or" in this specification describes an association relationship of associated objects, indicating that three relationships may exist. For example, a display panel and/or a backlight may indicate three cases: only the display panel exists, both the display panel and the backlight exist, and only the backlight exists. A character "/" in this specification indicates an "or" relationship between associated objects. For example, input/output indicates input or output.

In the embodiments of the present application, the term such as "exemplary" or "for example" is used to indicate an example, an instance, or a description. Any embodiment or design scheme described as "exemplary" or "an example" in the embodiments of the present application should not be construed as being preferable or advantageous than other embodiments or design schemes. To be precise, the use of the term such as "exemplary" or "for example" is intended to present a related concept in a specific manner.

Some concepts and/or terms related in an information indicating method, a device and a system provided by the embodiments of the present application are described below.

COT sharing transmission of the unlicensed communication system:

(1) the network device initiates the acquired COT

After acquiring a channel through LBT Cat 4, the network device may indicate whether the COT may be shared by the UE of Autonomous UpLink access (AUL) through a 'COT sharing indication for AUL' field included in Downlink Control Information (DCI), wherein the field "UpLink (UL) duration and offset" indicates a COT time period which may/may not be shared by the UE of AUL. When the network device uses the maximum LBT priority class (the larger the value, the lower the priority class) to perform LBT to acquire the channel and transmit Physical Downlink Shared CHannel (PDSCH) within the COT, the network device may set the field to true, that is, the UE of AUL is allowed to transmit within a specified time range. Otherwise, the network device sets the field to false, that is, the UE of AUL is not allowed to transmit within the specified time range.

(2) UE initiates the acquired COT

The UE of AUL transmits information on the resource which is pre-configured by the network device in advance. The UE of AUL may be shared with the network device to transmit information through the channel acquired by the LBT Cat 4. The UE transmits AUL-UCI in a subframe n, wherein the field "COT sharing indication" including 1 bit indicates whether eNB may share the COT acquired by the UE in a subframe n+X. X is configured by Radio Resource Control (RRC), and 1<X<5. In a case that the field is '1', it represents that the network device may perform downlink transmission in the subframe, and the downlink transmission of the network device only can transmit Physical Downlink Control CHannel (PDCCH) and cannot send the PDSCH.

COT shares transmission:

Single-time and multi-time DownLink (DL) to UL switch and UL to DL switch are supported within the COT acquired by the network device, and the network device will ensure that gap will not appear in the interval greater than 16 us and less than 25 us.

The embodiments of present application provide an information indicating method, a device and a system. UE may send the PUSCH bearing the UCI to the network device so as to indicate remaining MCOT information which is used to indicate a remaining MCOT of a COT within which the UE performs uplink transmission and/or a target time period (that is, the time period allowing the network device to transmit downlink data within the COT within which the uplink transmission is) to the network device. The UE may indicate the remaining MCOT information and/or the target time period to the network device through the UCI, so that the network device may share the COT of the UE performing uplink transmission according to the remaining MCOT information and/or the target time period, thereby effectively transmitting downlink data.

The information indicating method, the device and the system provided by the embodiments of the present application may be applied to the communication system. The information indicating method, the device and the system provided by the embodiments of the present application may be specifically applied to the process that the UE indicates time information of perform downlink data transmission to the network device based on the communication system.

FIG. 1 shows a schematic architectural diagram of a communications system according to an embodiment of the present application. As shown in FIG. 1, the communications system may include UE 01 and a network device 02. The UE 01 and the network device 02 may establish a connection and communicate with each other.

UE is a device providing voice and/or data connectivity to a user, a handheld device having a wired/wireless connection function, or other processing device connected to a wireless modem. The UE may communicate with one or more core networks by using a Radio Access Network (RAN). The UE may be a mobile terminal, for example, a mobile phone (or referred to as a "cellular" phone) and a computer that has a mobile terminal; or may be a portable, pocket-sized, handheld, computer built-in, or in-vehicle mobile apparatus that exchanges voice and/or data with the RAN, for example, a device such as a Personal Communications Service (PCS) phone, a cordless phone, a Session Initiation Protocol (SIP) phone, a Wireless Local Loop (WLL) station, or a Personal Digital Assistant (PDA). UE may also be referred to as a user agent (user agent) or a terminal device.

The network device may be a base station. The base station is an apparatus deployed in the RAN to provide a wireless communication function for the UE. The base station may include various forms of macro base stations, micro base stations, relay stations, access points, and the like. In the systems adopting different radio access technologies, the names of the devices with the base station functions may be different. For example, in the third generation mobile communication (3G) network, the device is called a nodeB (NodeB); in the Long-Term Evolution (LTE) system, the device is called an evolved NodeB (evolved NodeB, eNB or eNodeB); and in the 5th Generation (5G) mobile communication network, the device is called gNB. The name "base station" may vary with evolution of communications technologies. It should be noted that the embodiments of the present application only use the 5G network as exemplary description, but should not be used as a scenario limitation in the embodiments of the present application.

The information indicating method, the device and the system provided by the embodiments of the present application are described below in detail with reference to the drawings and through the specific embodiments and the present application scenarios thereof.

Figure 2:
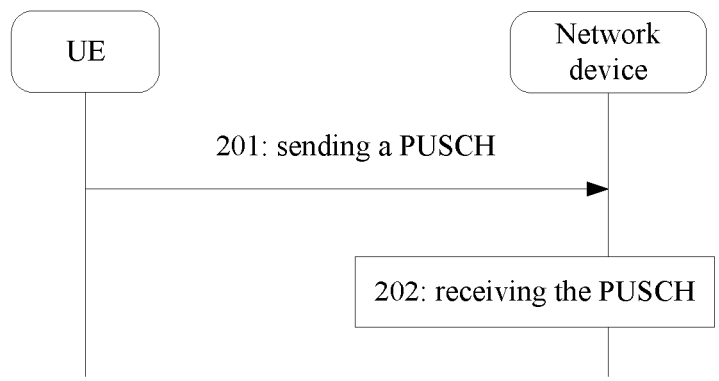
FIG. 2 is a schematic diagram of an information indicating method according to an embodiment of the present application.

Based on the communication system shown in FIG. 1, the embodiments of the present application provide an information indicating method. As shown in FIG. 2, the information indicating method may include the following step 201 and step 202.

Step 201: UE sends a PUSCH to a network device.

Step 202: the network device receives the PUSCH.

In the embodiments of the present application, the PUSCH bears UCI. The UCI is used to indicate at least one of the following: remaining MCOT information which is used to indicate a remaining MCOT of a COT within which the UE performs uplink transmission a target time period, wherein the target time period is: the time period allowing the network device to transmit downlink data within COT within which uplink transmission is.

In some embodiments, in the embodiments of the present application, the uplink transmission may be configured grant transmission.

It may be understood that the PUSCH may be a PUSCH transmitted by the UE on the configured grant resource (that is, a CG-PUSCH). The COT may be COT acquired by the UE through the LBT Cat 4 for perform configured grant transmission.

In some embodiments, in a possible implementation manner of the embodiments of the present application, in a case that the UCI is used to indicate remaining MCOT information, the remaining MCOT information includes the start position of the COT and the length of the MCOT.

It may be understood that the UE may implicitly indicate the remaining MCOT information to the network device through the start position of the COT and the length of the MCOT.

In some embodiments, in the embodiments of the present application, the UCI may include LBT priority class information, the LBT priority class information is used to indicate the priority class of the LBT adopted by the UE to acquire the COT, and the priority class of the LBT corresponds to the length of the MCOT.

It should be noted that the length of the MCOT is the maximum duration of the COT.

In some embodiments, in the embodiments of the present application, the LBT priority class information may be explicitly indicated by the UCI field transmitted by CG or may be agreed by a protocol. For example, under the condition agreed by the protocol, the UE may allow to share the COT to the network device when acquiring the channel through the minimum priority class value (LBT priority class value).

In some embodiments, in the embodiments of the present application, the start position of the COT is indicated by first indication information and second indication information, the first indication information is used to indicate whether the PUSCH is a first PUSCH transmitted within the COT, and the second indication information is used to indicate the time length from the end position or the start position of the current PUSCH to the start position of the COT.

In some embodiments, in the embodiments of the present application, the first indication information indicates whether the PUSCH is the first PUSCH of the COT by any one of the following modes: (1), (2) and (3).

(1) Indicating through bit indication information.

Exemplarily, bit '1' represents yes, and bit '0' represents no.

(2) Indicating through the toggle result of toggle bit (toggle bit) information.

It should be noted that the toggle result may be understood as: the result obtained by the UE toggling the bit after acquiring the COT through the LBT Cat 4.

(3) Indicating through order sequence of the PUSCH indicated by Uplink Assignment Index (UAI) bit information.

It should be noted that the network device may obtain the number of the offset serial number of the current PUSCH and the first PUSCH according to the field (for example, field '00', field '01', field '10' or field '11') carried in the current PUSCH, so as to obtain the start position of the first PUSCH.

Exemplarily, assuming that the UAI bit is '00', that is, the field carried in the current PUSCH is '00', the network device may determine that the number of the offset serial number of the current PUSCH and the first PUSCH is 0, that is, the network device may determine that the current PUSCH is the first PUSCH, so that the start position of the first PUSCH is obtained; and assuming that the UAI bit is '01', that is, the field carried in the current PUSCH is '01', the network device may determine that the number of the offset serial number of the current PUSCH and the first PUSCH is 1, the network device may determine that one PUSCH before the current PUSCH is the first PUSCH, so that the start position of the first PUSCH is obtained.

In some embodiments, in the embodiments of the present application, the second indication information may include any one of the following (A), (B) and (C):
- (A) the number of symbols which start from the end position or the start position of the PUSCH to the start position of the COT;
- (B) the number of time units which start from the end position or the start position of the PUSCH to the start position of the COT, and the offset number of the symbol serial number of the end position or the start position of the PUSCH relative to the start position of the COT; and
- (C) the number of time units which start from the end position or the start position of the PUSCH to the start position of the COT, and the number of symbols included in a slot where the start position of the COT is located.

In some embodiments, in the embodiments of the present application, the start position of the COT may be the start position of the first PUSCH of the COT acquired by the network device through blind detection.

It may be understood that the network device may acquire the start position of the first PUSCH of the CG PUSCH allowing to share COT through blind detection, and may take the start position of the first PUSCH as the start position of the COT.

In some embodiments, in another possible implementation manner of the embodiments of the present application, in a case that the UCI is used to indicate remaining MCOT information and the target time period, the remaining MCOT information may include any one of the following (a), (b) and (c):
- (a) the number of symbols (symbol) which start from the end position or the start position of the PUSCH to the end position of the MCOT;
- (b) the number of time units which start from the end position or the start position of the PUSCH to the end position of the MCOT, and the offset number of the symbol serial number of the end position or the start position of the PUSCH relative to the end position of the MCOT; and
- (c) the number of time units which start from the end position or the start position of the PUSCH to the end position of the MCOT, and the number of symbols included in a slot where the end position of the MCOT is located.

In some embodiments, in the embodiments of the present application, the time units may be: slot (slot), or millisecond (ms), or the time length of the PUSCH.

In the embodiments of the present application, the UE may indicate remaining MCOT information which is used to indicate a remaining MCOT of a COT within which the UE performs uplink transmission and/or the target time period to the network device, so that the network device may receive data accurately and rapidly according to the remaining MCOT information to avoid leak detection or error detection, thereby acquiring information allowing to share the channel and improving the data transmission efficiency of the network device.

In some embodiments, in the embodiments of the present application, the UCI is specifically used to indicate the start position of the target time period.

In some embodiments, in the embodiments of the present application, in a case that the UCI is used to indicate the start position of the target time period, the UCI is further used to indicate the time units of the offset time and the number of the time units included in the offset time, and the offset time is the time from the end position or the start position of the PUSCH to the start position of the target time period.

In some embodiments, in the embodiments of the present application, the UCI indicates the start position of the target time period, that is, $t_0+X*t_g$, wherein $t_0$ is the end position or the start position of the current CG PUSCH, $t_g$ indicates the time unit of the end position or the start position of the CG PUSCH offsetting relative to the end position of the MCOT, and X is the number of the configured time offset relative to the time units.

It should be noted that the time units may be indicated by UCI, or may be predefined, or may be configured by RRC; the time units specifically may be ms, slot, mini-slot, symbol or the time length of the CG PUSCH where the UCI is located; the number of the time units may be configured by RRC or may be dynamically indicated by UCI; and $t_g$ and X may be indicated in UCI through independent coding or joint coding, and the joint coding table may be agreed by the protocol or may be configured by RRC.

In some embodiments, in the embodiments of the present application, the start position of the target time period may be the end position of the last PUSCH of the COT acquired by the network device through blind detection.

It may be understood that the network device may acquire the end position of the last PUSCH of the CG PUSCH allowing to share COT through blind detection, and may take the end position of the last PUSCH as the start position of the COT.

In some embodiments, in the embodiments of the present application, the LBT type of the network device in the target time period is indicated by the UCI or is predefined.

In some embodiments, in the embodiments of the present application, the LBT type may include at least one of the following: 16 us LBT Category 1 (Cat 1), 16 us Cat 2 and 25 us Cat 2.

In some embodiments, in the embodiments of the present application, the time length of the target time period is indicated by the UCI, or is predefined (such as one slot), or is configured by RRC, or is determined by the network device according to the adopted LBT type.

In some embodiments, in the embodiments of the present application, in a case that the time length of the target time period is indicated by UCI, the UCI is specifically used to indicate the end position of the target time period, or the time units of the time length of the target time period and the number of the time units included in the time length.

In some embodiments, in the embodiments of the present application, the network device may determine the time length of the target time period according to the LBT type.

In some embodiments, in the embodiments of the present application, the time length of the target time period may be: m pieces of ms, m slots, m mini-slots, m symbols or m time lengths of the current CG PUSCH.

In some embodiments, in the embodiments of the present application, in a case that the UCI is used to indicate the end position of the target time period, the UCI is specifically used to indicate third indication information, and the third indication information includes any one of the following (d), (e) and (f):

(d) the number of time units which start from the end position or the start position of the PUSCH to the end position of the target time period;

(e) the number of time units which start from the end position or the start position of the PUSCH to the end position of the target time period, and the offset number of the symbol serial number of the end position or the start position of the PUSCH relative to the end position of the target time period; and (f) the number of time units which start from the end position or the start position of the PUSCH to the end position of the target time period, and the number of symbols included in a slot where the end position of the target time period is located.

In some embodiments, in the embodiments of the present application, the time units may be: slot, or millisecond, or the time length of the PUSCH.

In some embodiments, in the embodiments of the present application, the time units may be configured by the network device, or may be fixed, or may be dynamically indicated through downlink control information.

In some embodiments, in the embodiments of the present application, the UCI is further used to indicate the UE to support one-time uplink and downlink switching or multi-time uplink and downlink switching within the COT.

In some embodiments, in the embodiments of the present application, whether the UE supports one-time uplink and downlink switching or multi-time uplink and downlink switching within COT may be configured by RRC, or may be indicated by a mark bit carried in the UCI.

In some embodiments, in the embodiments of the present application, in a case that the UCI indicates the UE to support one-time uplink and downlink switching within COT, the UCI is used to indicate the remaining MCOT information and the target time period; the remaining MCOT information may include any one of (a), (b) and (c) described in the above embodiments, or the remaining MCOT information includes the start position of the COT and the length of the MCOT; or the UCI is used to indicate the target time period.

In some embodiments, in the embodiments of the present application, in a case that the UCI indicates the UE to support multi-time uplink and downlink switching within COT, the UCI is used to indicate the remaining MCOT information and the target time period; and the remaining MCOT information may include any one of (a), (b) and (c) described in the above embodiments, or the remaining MCOT information includes the start position of the COT and the length of the MCOT.

In the embodiments of the present application, the UE may directly indicate the target time period allowing the network device to transmit downlink data within COT to the network device, so that the network device can receive data accurately and rapidly according to the target time period to avoid leak detection or error detection, thereby acquiring information allowing to share the channel. The UE does not need to indicate the number of slots of the remaining MCOT and the number of the symbols through a plurality of bits, so that the signaling overhead is saved while the data transmission efficiency of the network device is improved.

The embodiments of the present application provide an information indicating method. The UE may send a PUSCH bearing UCI to the network device so as to indicate remaining MCOT information which is used to indicate a remaining MCOT of a COT within which the UE performs uplink transmission and/or a target time period (that is, the time period allowing the network device to transmit downlink data within the COT within which the uplink transmission is) to the network device. The UE may indicate the remaining MCOT information and/or the target time period to the network device through the UCI, so that the network device may share the COT of the UE performing uplink transmission according to the remaining MCOT information and/or the target time period, thereby effectively transmitting downlink data.

The information indicating method provided by the embodiments of the present application is described below through specific embodiments (that is, embodiment 1, embodiment 2, embodiment 3 and embodiment 4).

Embodiment 1 (a Solution Describing Remaining MCOT Information and a Target Time Period)

Field remaining COT (that is, Remaining COT) is displayed and included in each UCI transmitted by CG, that is, the UCI borne on each configured grant-PUSCH (that is, CG-PUSCH), and the indicated content may be any one of (a), (b) and (c) in the above embodiments. The starting point (that is, the start position) of the shared COT may be the end position of the last PUSCH within COT which may be shared by the network device through blind detection.

Figure 3:
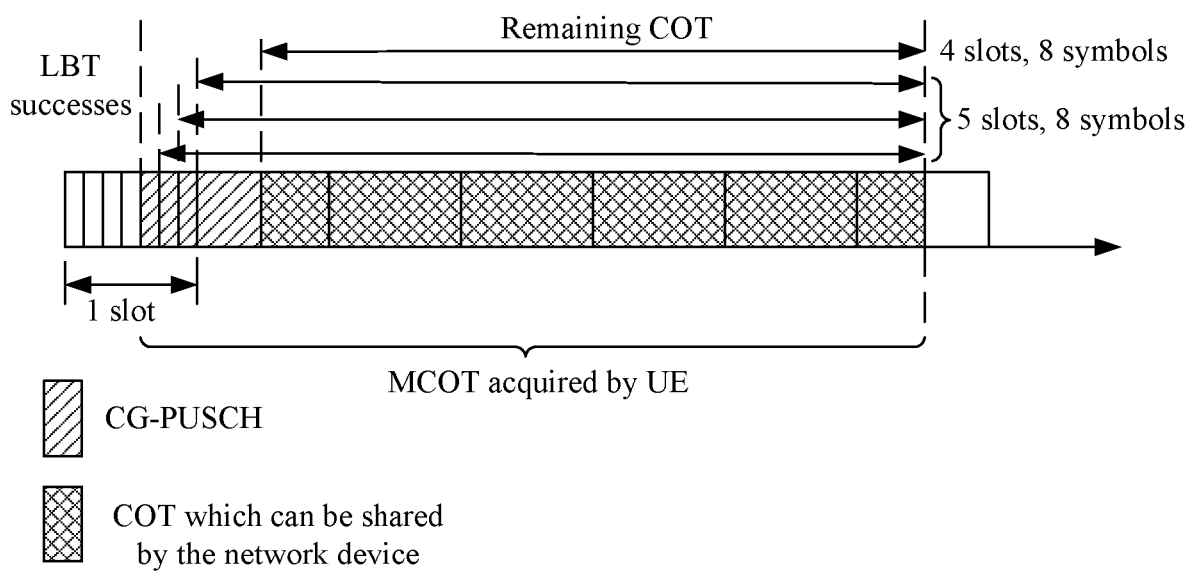
FIG. 3 is a first schematic diagram of an example of a COT according to an embodiment of the present application.

Exemplarily, it is assumed that the remaining COT length may be (c) in the above embodiments. As shown in FIG. 3, the UE sends 4 PUSCHs after performing LBT CAT 4 successfully, the Remaining COT carried in the UCI is '1001000' and '1011000' respectively. The first three PUSCHs indicate that the remaining COT length is "5 slots, 8 symbols" (that is, the number of the time units which start from the end position or the start position of the PUSCH to the end position of the remaining COT is 5 slots, and the number of the symbols included in the slot where the end position of the remaining COT is located is 8 symbols), and the last PUSCH indicates that the remaining COT length is "4 slots, 8 symbols". Through blind detection of the network device, the end position of the last PUSCH is the start position shared by the COT.

It should be noted that the related content which the embodiment 1 relates to may be referenced to the related description in the above embodiments, so details are not described herein again.

Embodiment 2 (a Solution Describing the Remaining MCOT Information and the Start Position of the Target Time Period)

The field LBT priority class (LBT priority class) information (indicating the LBT priority class) is included in each UCI transmitted by the CG, that is, the UCI borne on each CG-PUSCH. Since different LBT priority classes correspond to different MCOT, the field may be used to indirectly indicate the length of the MCOT. The start position of the COT indicates whether the current CG PUSCH is the first CG transmission PUSCH acquired by the LBT Cat 4 through the UAI carried in the UCI. The UCI indicates the end position of the last PUSCH of the CG PUSCH or the start position which can be shared to the network device, that is, $t_0 + X \cdot t_g$.

Figure 4:
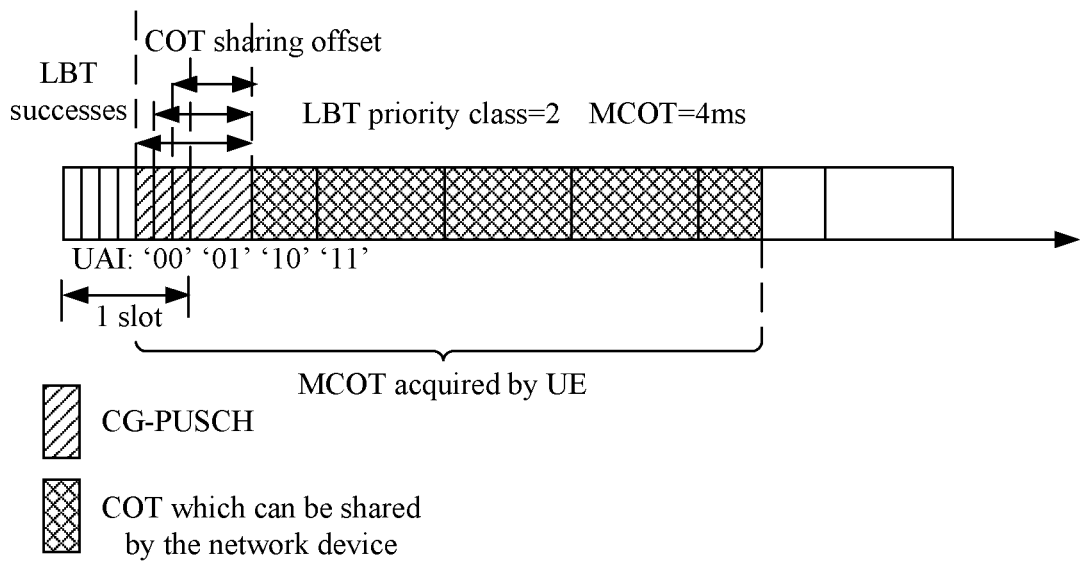
FIG. 4 is a second schematic diagram of an example of a COT according to an embodiment of the present application.

Exemplarily, as shown in FIG. 4, LBT priority class=2, MCOT=4 ms, and the bits of the UAI are '00', '01', '10' or '11'. $T_g$ is 1 symbol agreed by a protocol, X is indicated by UCI through field COT sharing offset (that is, COT Sharing Offset), COT Sharing Offset fields carried in 3 PUSCHs in FIG. 4 are respectively '1101', '1011' and '1001' and respectively indicate 13 symbols, 11 symbols and 9 symbols.

It should be noted that the related content which the embodiment 2 relates to may be referenced to the related description in the above embodiments, so details are not described herein again.

Embodiment 3 (a Solution Describing a Target Time Period)

Field remaining COT is displayed included in each UCI transmitted by CG, that is, the UCI borne on each CG-PUSCH, and the indicated content may be any one of (a), (b) and (c) in the above embodiments. Through blind detection of the network device, the end position of the last PUSCH of the CG PUSCH burst is acquired to serve as the start position which can be shared to the network device after CG transmission. The UCI indicates that the network device shares the LBT type which can be adopted by the COT. The network device determines the time length which can be shared according to the MCOT information, the end position of the last PUSCH of the CG PUSCH burst and the adopted LBT type.

It should be noted that the related content which the embodiment 3 relates to may be referenced to the related description in the above embodiments, so details are not described herein again.

Embodiment 4 (a Solution Describing a Target Time Period)

The UCI indicates the end position of the last PUSCH of the CG PUSCH burst or the start position which can be shared to the network device, that is, $t_0+X*t_g$.

Figure 5:
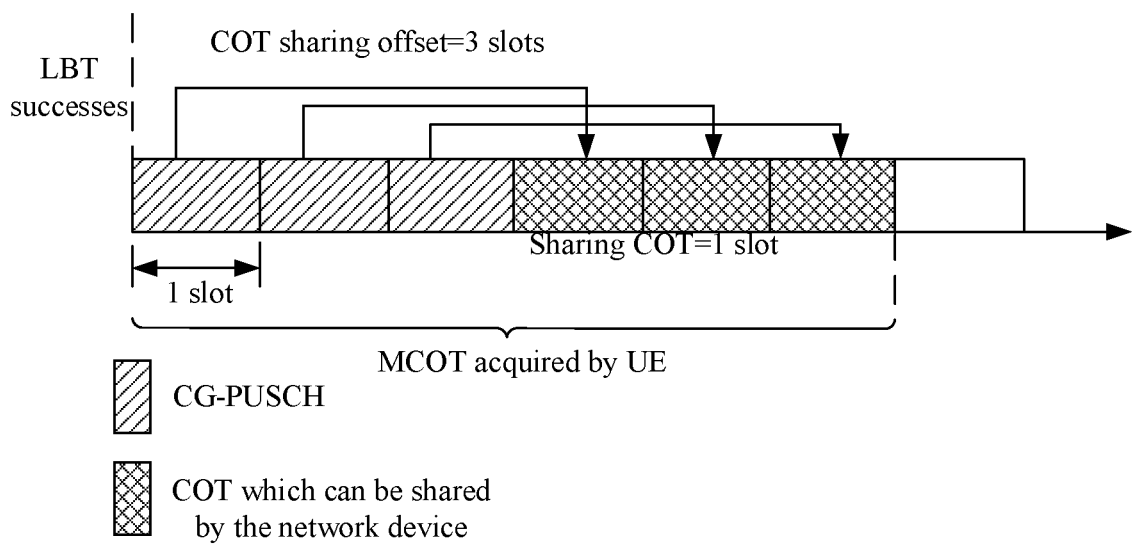
FIG. 5 is a third schematic diagram of an example of a COT according to an embodiment of the present application.

Exemplarily, as shown in FIG. 5, the field COT Sharing Offset starts to share after indicating X time units, the time unit $T_g$ is the length of the CG PUSCH where the current UCI is located, and the field sharing COT (that is, Sharing COT) indicates that the network device may share m time units. COT Sharing Offset is configured as 3 time units through RRC, and Sharing COT indicates 1 slot. The network device may share COT of UE in 1 slot after 3 slots after the current PUSCH.

It should be noted that the related content which the embodiment 4 relates to may be referenced to the related description in the above embodiments, so details are not described herein again.

Figure 6:
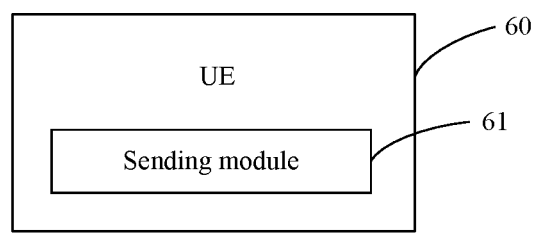
FIG. 6 is a schematic structural diagram of UE according to an embodiment of the present application.

FIG. 6 is a possible schematic structural diagram of UE according to an embodiment of the present application. As shown in FIG. 6, the UE 60 provided by the embodiments of the present application may include: a sending module 61.

The sending module 61 is configured to send a PUSCH, wherein the PUSCH bears UCI, the UCI is used to indicate at least one of the following: remaining MCOT information which is used to indicate a remaining MCOT of a COT within which the UE performs uplink transmission, or a target time period, and the target time period is: a time period for allowing a network device to transmit downlink data within COT within which uplink transmission is.

In a possible implementation manner, in a case that the UCI is used to indicate the remaining MCOT information and the target time period, the remaining MCOT information includes any one of the following: the number of symbols which start from the end position or the start position of the PUSCH to the end position of the MCOT; the number of time units which start from the end position or the start position of the PUSCH to the end position of the MCOT, and the offset number of the symbol serial number of the end position or the start position of the PUSCH relative to the end position of the MCOT; and the number of the time units which start from the end position or the start position of the PUSCH to the end position of the MCOT, and the number of the symbols included in the slot where the end position of the MCOT is located.

In a possible implementation manner, in a case that the UCI is used to indicate the remaining MCOT information, the remaining MCOT information includes the start position of the COT and the length of the MCOT.

In a possible implementation manner, the UCI includes LBT priority class information, the LBT priority class information is used to indicate the priority class of the LBT adopted by the UE to acquire the COT, and the priority class of the LBT corresponds to the length of the MCOT.

In a possible implementation manner, the start position of the COT is indicated through first indication information and second indication information, the first indication information is used to indicate whether the PUSCH is a first PUSCH of the COT, and the second indication information is used to indicate the time length from the end position or the start position of the PUSCH to the start position of the COT.

In a possible implementation manner, the first indication information indicates whether the PUSCH is the first PUSCH of the COT in the following modes: indicating through bit indication information, or indicating through the toggle result of the toggle bit information, or indicating through order information of the PUSCH indicated by UAI bit information.

In a possible implementation manner, the second indication information includes any one of the following: the number of symbols which start from the end position or the start position of the PUSCH to the start position of the COT; the number of time units which start from the end position or the start position of the PUSCH to the start position of the COT, and the offset number of the symbol serial number of the end position or the start position of the PUSCH relative to the start position of the COT; and the number of the time units which start from the end position or the start position of the PUSCH to the start position of the COT, and the number of the symbols included in the slot where the start position of the COT is located.

In a possible implementation manner, the UCI is specifically used to indicate the start position of the target time period.

In a possible implementation manner, in a case that the UCI is used to indicate the start position of the target time period, the UCI is further used to indicate the time units of the offset time and the number of the time units included in the offset time, and the offset time is the time from the end position or the start position of the PUSCH to the start position of the target time period.

In a possible implementation manner, the LBT type of the network device in the target time period is indicated by the UCI or is predefined.

In a possible implementation manner, the time length of the target time period is indicated by the UCI, or is predefined, or is configured by RRC.

In a possible implementation manner, in a case that the time length of the target time period is indicated by the UCI, the UCI is specifically used to indicate the end position of the target time period, or the time units of the time length of the target time period and the number of the time units included in the time length.

In a possible implementation manner, in a case that the UCI is used to indicate the end position of the target time period, the UCI is specifically used to indicate third indication information. The third indication information includes any one of the following: the number of the time units which start from the end position or the start position of the PUSCH to the end position of the target time period; the number of the time units which start from the end position or the start position of the PUSCH to the end position of the target time period, and the offset number of the symbol serial number of the end position or the start position of the PUSCH relative to the end position of the target time period; and the number of the time units which start from the end position or the start position of the PUSCH to the end position of the target time period, and the number of the symbols included in the slot where the end position of the target time period.

In a possible implementation manner, the time units may be: slot, or millisecond, or the time length of the PUSCH.

In a possible implementation manner, the UCI is further used to indicate the UE to support one-time uplink and downlink switching or multi-time uplink and downlink switching within the COT.

The UE provided in an embodiment of the present application can implement the processes implemented by the UE in the foregoing method embodiments. To avoid repetition, details are not described herein again.

The embodiments of the present application provide UE. The UE may send a PUSCH bearing UCI to the network device so as to indicate remaining MCOT information which is used to indicate a remaining MCOT of a COT within which the UE performs uplink transmission and/or a target time period (that is, the time period allowing the network device to transmit downlink data within the COT within which the uplink transmission is) to the network device. The UE may indicate the remaining MCOT information and/or the target time period to the network device through the UCI, so that the network device may share the COT of the UE performing uplink transmission according to the remaining MCOT information and/or the target time period, thereby effectively transmitting downlink data.

Figure 7:
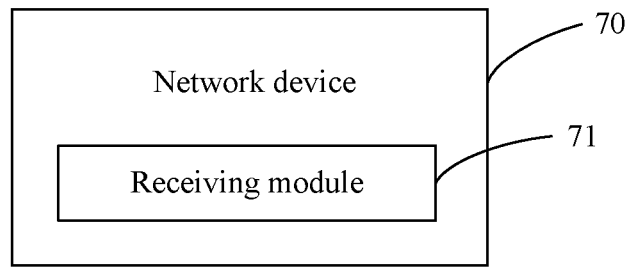
FIG. 7 is a structural schematic diagram of a network device according to an embodiment of the present application.

FIG. 7 is a possible schematic structural diagram of a network device according to an embodiment of the present application. As shown in FIG. 7, the network device 70 provided by the embodiments of the present application may include: a receiving module 71.

The receiving module 71 is configured to receive a PUSCH, wherein the PUSCH bears UCI, the UCI is used to indicate at least one of the following: remaining MCOT information which is used to indicate a remaining MCOT of a COT within which the UE performs uplink transmission, or a target time period, and the target time period is: a time period for allowing a network device to transmit downlink data within COT within which uplink transmission is.

In a possible implementation manner, in a case that the UCI is used to indicate the remaining MCOT information and the target time period, the remaining MCOT information includes any one of the following: the number of symbols which start from the end position or the start position of the PUSCH to the end position of the MCOT; the number of time units which start from the end position or the start position of the PUSCH to the end position of the MCOT, and the offset number of the symbol serial number of the end position or the start position of the PUSCH relative to the end position of the MCOT; and the number of the time units which start from the end position or the start position of the PUSCH to the end position of the MCOT, and the number of the symbols included in the slot where the end position of the MCOT is located.

In a possible implementation manner, in a case that the UCI is used to indicate the remaining MCOT information, the remaining MCOT information includes the start position of the COT and the length of the MCOT.

In a possible implementation manner, the UCI includes LBT priority class information, the LBT priority class information is used to indicate the priority class of the LBT adopted by the UE to acquire the COT, and the priority class of the LBT corresponds to the length of the MCOT.

In a possible implementation manner, the start position of the COT is indicated through first indication information and second indication information, the first indication information is used to indicate whether the PUSCH is a first PUSCH of the COT, and the second indication information is used to indicate the time length from the end position or the start position of the PUSCH to the start position of the COT; or the start position of the COT is the start position of the first PUSCH of the COT acquired by the network device through blind detection.

In a possible implementation manner, the first indication information indicates whether the PUSCH is the first PUSCH of the COT in the following modes: indicating through bit indication information, or indicating through the toggle result of the toggle bit information, or indicating through order information of the PUSCH indicated by UAI bit information.

In a possible implementation manner, the second indication information includes any one of the following: the number of symbols which start from the end position or the start position of the PUSCH to the end position of the COT; the number of time units which start from the end position or the start position of the PUSCH to the start position of the COT, and the offset number of the symbol serial number of the end position or the start position of the PUSCH relative to the start position of the COT; and the number of the time units which start from the end position or the start position of the PUSCH to the start position of the COT, and the number of the symbols included in the slot where the start position of the COT is located.

In a possible implementation manner, the UCI is specifically used to indicate the start position of the target time period.

In a possible implementation manner, in a case that the UCI is used to indicate the start position of the target time period, the UCI is further used to indicate time units of offset time and the number of the time units included in the offset time, and the offset time is the time from the end position or the start position of the PUSCH to the start position of the target time period; or the start position of the target time period is the end position of the last PUSCH of the COT acquired by the network device through blind detection.

In a possible implementation manner, the LBT type of the network device in the target time period is indicated by the UCI or is predefined.

In a possible implementation manner, the time length of the target time period is indicated by UCI, or is predefined, or is configured by RRC, or is determined by the network device according to the adopted LBT type.

In a possible implementation manner, in a case that the time length of the target time period is indicated by the UCI, the UCI is specifically used to indicate the end position of the target time period, or the time units of the time length of the target time period and the number of the time units included in the time length.

In a possible implementation manner, in a case that the UCI is used to indicate the end position of the target time period, the UCI is specifically used to indicate third indication information. The third indication information includes any one of the following: the number of the time units which start from the end position or the start position of the PUSCH to the end position of the target time period; the number of the time units which start from the end position or the start position of the PUSCH to the end position of the target time period, and the offset number of the symbol serial number of the end position or the start position of the PUSCH relative to the end position of the target time period; and the number of the time units which start from the end position or the start position of the PUSCH to the end position of the target time period, and the number of the symbols included in the slot where the end position of the target time period.

In a possible implementation manner, the time units may be: slot, or millisecond, or the time length of the PUSCH.

In a possible implementation manner, the UCI is further used to indicate the UE to support one-time uplink and downlink switching or multi-time uplink and downlink switching within the COT.

The network device provided by the embodiments of the present application can implement the processes implemented by the network device in the foregoing method embodiments. To avoid repetition, details are not described herein again.

The embodiments of the present application provide a network device. The network device may receive the PUSCH which bears UCI and is transmitted by UE so as to acquire remaining MCOT information which is used to indicate a remaining MCOT of a COT within which the UE performs uplink transmission and/or the target time period (that is, the time period allowing the network device to transmit downlink data within the COT within which uplink transmission is). Since the network device may acquire remaining MCOT information and/or the target time period through the UCI, the network device may share the COT of the UE performing uplink transmission according to the remaining MCOT information and/or the target time period, so that downlink data can be effectively transmitted.

Figure 8:
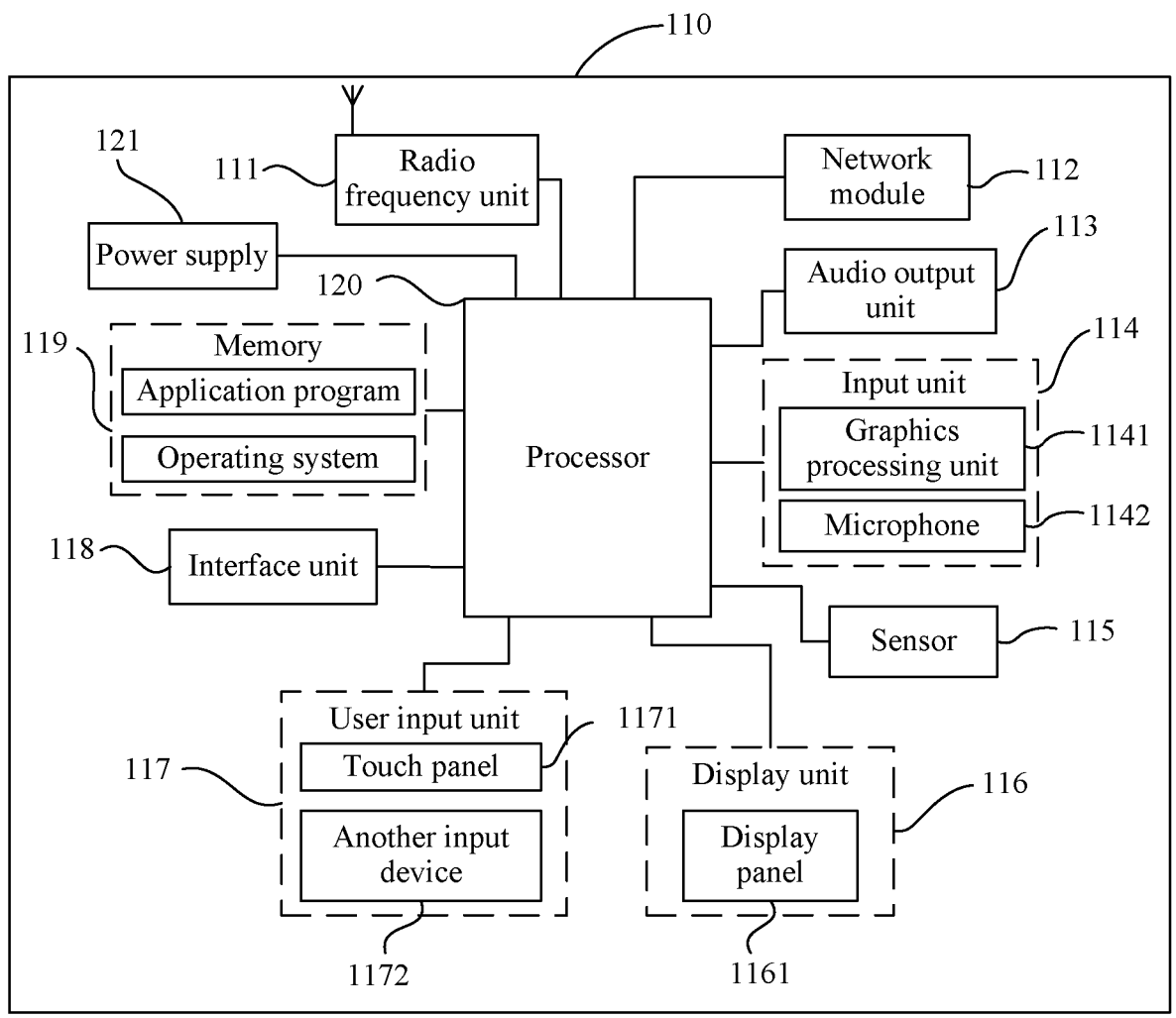
FIG. 8 is a schematic diagram of hardware of UE according to an embodiment of the present application.

FIG. 8 is a schematic diagram of hardware of UE according to an embodiment of the present application. As shown in FIG. 8, the UE 110 includes but is not limited to: a radio frequency unit 111, a network module 112, an audio output unit 113, an input unit 114, a sensor 115, a display unit 116, a user input unit 117, an interface unit 118, a memory 119, a processor 120, a power supply 121, and other components.

It should be noted that a person skilled in the art may understand that the structure of the UE shown in FIG. 8 does not constitute a limitation to the UE. The UE may include more or fewer components than those shown in FIG. 8, or a combination of some components, or an arrangement of different components. For example, in this embodiment of the present application, the UE includes but is not limited to a mobile phone, a tablet computer, a notebook computer, a palmtop computer, a vehicle-mounted terminal, a wearable device, and a pedometer.

The radio frequency unit 111 is configured to send a PUSCH, wherein the PUSCH bears UCI, the UCI is used to indicate at least one of the following: remaining MCOT information which is used to indicate a remaining MCOT of a COT within which the UE performs uplink transmission, or a target time period, and the target time period is: a time period for allowing a network device to transmit downlink data within COT within which uplink transmission is.

The embodiments of the present application provide UE. The UE may send a PUSCH bearing UCI to the network device so as to indicate remaining MCOT information which is used to indicate a remaining MCOT of a COT within which the UE performs uplink transmission and/or a target time period (that is, the time period allowing the network device to transmit downlink data within the COT within which the uplink transmission is) to the network device. The UE may indicate the remaining MCOT information and/or the target time period to the network device through the UCI, so that the network device may share the COT of the UE performing uplink transmission according to the remaining MCOT information and/or the target time period, thereby effectively transmitting downlink data.

It should be understood that, in the embodiments of the present application, the radio frequency unit 111 may be configured to receive and transmit information, or receive and transmit signals during a call. Specifically, the radio frequency unit 111 receives downlink data from a base station, and transmits the downlink data to the processor 120 for processing; and in addition, transmits uplink data to the base station. Generally, the radio frequency unit 111 includes, but is not limited to, an antenna, at least one amplifier, a transceiver, a coupler, a low noise amplifier, and a duplexer, and the like. In addition, the radio frequency unit 111 may also communicate with a network and other devices through a wireless communication system.

The UE provides a user with wireless broadband Internet access by using the network module 112, for example, helps the user send and receive emails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may also provide audio output (for example, call signal receiving sound or message receiving sound) related to a specific function performed by the UE 110. The audio output unit 113 includes a speaker, a buzzer, a telephone receiver, and the like.

The input unit 114 is configured to receive audio or radio frequency signals. The input unit 114 may include a Graphics Processing Unit (GPU) 1141 and a microphone 1142, and the graphics processing unit 1141 processes image data of a still picture or video obtained by an image capture apparatus (such as a camera) in a video capture mode or an image capture mode. A processed image frame may be displayed on the display unit 116. The image frame processed by the graphics processing unit 1141 may be stored in the memory 119 (or another storage medium) or transmitted via the radio frequency unit 111 or the network module 112. The microphone 1142 may receive a sound and can process such a sound into audio data. The processed audio data may be converted, in a phone calling mode, into a format that may be transmitted to a mobile communication base station by using the radio frequency unit 111 for output.

The UE 110 further includes at least one sensor 115, for example, a light sensor, a motion sensor, and another sensor. Specifically, the light sensor includes an ambient light sensor and a proximity sensor. The ambient light sensor may adjust luminance of the display panel 1161 based on brightness of ambient light. The proximity sensor may turn off the display panel 1161 and/or backlight when the UE 110 is moved to an ear. As a motion sensor, an accelerometer sensor may detect magnitude of acceleration in various directions (usually three axes), may detect magnitude and the direction of gravity when stationary, may be configured to identify UE postures (such as horizontal and vertical orientation switch, related games, and magnetometer posture calibration), may perform functions related to vibration identification (such as a pedometer and a knock), and the like. The sensor 115 may further include a fingerprint sensor, a pressure sensor, an iris sensor, a molecular sensor, a gyroscope, a barometer, a hygrometer, a thermometer, an infrared sensor, or the like. Details are not described herein.

The display unit 116 is configured to display information entered by the user or information provided for the user. The display unit 116 may include a display panel 1161. The display panel 1161 may be configured in a form of a Liquid Crystal Display (LCD), an Organic Light-Emitting Diode (OLED), or the like.

The user input unit 117 may be configured to receive input numeric or character information, and generate key signal inputs related to user settings and function control of the UE. Specifically, the user input unit 117 includes a touch panel 1171 and another input device 1172. The touch panel 1171, also called a touch screen, may collect touch operation on or near the touch panel by users (for example, operation on the touch panel 1171 or near the touch panel 1171 by fingers or any suitable objects or accessories such as a touch pen by the users). The touch panel 1171 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 120, and receives and executes a command from the processor 120. In addition, the touch panel 1171 may be implemented in a plurality of forms, such as a resistive type, a capacitive type, an infrared ray type or a surface acoustic wave type. In addition to the touch panel 1171, the user input unit 117 may further include other input devices 1172. Specifically, the other input devices 1172 may include but are not limited to: a physical keyboard, a function key (such as a volume control key, a switch key), a trackball, a mouse, and a joystick, which is no longer repeated here.

Further, the touch panel 1171 can cover the display panel 1161. When detecting a touch operation on or near the touch panel 1171, the touch panel 1171 transmits the touch operation to the processor 120 to determine a type of a touch event. Then, the processor 120 provides corresponding visual output on the display panel 1161 based on the type of the touch event. Although in FIG. 8, the touch panel 1171 and the display panel 1161 are used as two independent components to implement input and output functions of the UE, in some embodiments, the touch panel 1171 and the display panel 1161 may be integrated to implement the input and output functions of the UE. This is not specifically limited herein.

The interface unit 118 is an interface for connecting an external apparatus to the UE 110. For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 118 may be configured to receive an input (for example, data information and power) from the external apparatus and transmit the received input to one or more elements in the UE 110, or transmit data between the UE 110 and the external apparatus.

The memory 119 may be configured to store a software program and various data. The memory 119 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 119 may include a high-speed random access memory or a nonvolatile memory, for example, at least one disk storage device, a flash memory, or other volatile solid-state storage devices.

The processor 120 is a control center of the UE, connects various parts of the entire UE by using various interfaces and circuits, and performs various functions of the UE and processes data by running or executing software programs and/or modules stored in the memory 119 and invoking data stored in the memory 119, so as to monitor the UE as a whole. The processor 120 may include one or more processing units. In some embodiments, an application processor and a modem processor may be integrated into the processor 120. The present application processor mainly processes an operating system, a user interface, an application, and the like. The modem processor mainly processes wireless communication. It can be understood that the above-mentioned modem processor may not be integrated in the processor 120.

The UE 110 may further include the power supply 121 (for example, a battery) supplying power to each component. In some embodiments, the power supply 121 may be logically connected to the processor 120 by using a power management system, so that functions such as charge and discharge management and power consumption management are implemented by using the power management system.

In addition, the UE 110 includes some function modules not shown. Details are not described herein.

In some embodiments, the present application further provides a UE, including the processor 120 shown in FIG. 8, a memory 119, and a computer program stored in the memory 119 and capable of running on the processor 120, wherein when the computer program is executed by the processor 120, the processes of the above method embodiments are implemented, and a same technical effect can be achieved. To avoid repetition, details are not described herein.

An embodiment of the present application further provides a computer readable storage medium, where the computer readable storage medium stores a computer program, where the computer program, when executed by the processor 120 shown in FIG. 8, implements the processes of the foregoing method embodiments, and the same technical effects can be achieved. To avoid repetition, details are not described herein again. The computer readable storage medium is a Read-Only Memory (ROM), a Random Access Memory (RAM), a magnetic disk, an optical disc, or the like.

Figure 9:
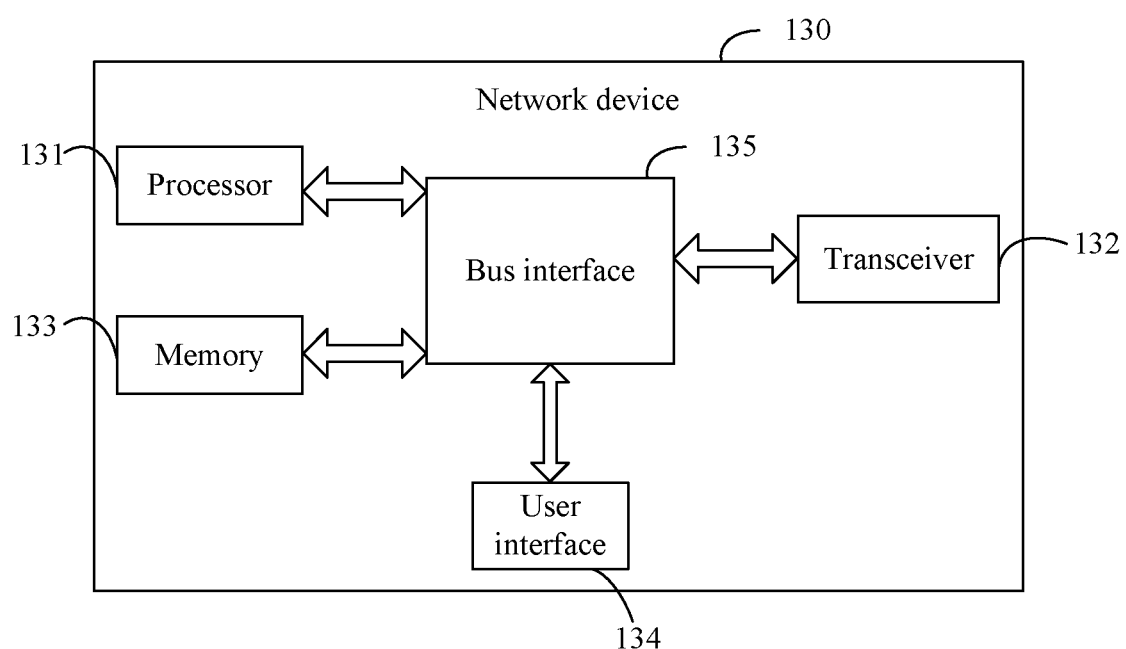
FIG. 9 is a schematic diagram of hardware of a network device according to an embodiment of the present application.

FIG. 9 is a schematic diagram of hardware of a network device according to an embodiment of the present application. As shown in FIG. 9, the network device 130 includes: a processor 131, a transceiver 132, a memory 133, a user interface 134 and a bus interface 135.

The transceiver 132 is configured to receive a PUSCH, wherein the PUSCH bears UCI, the UCI is used to indicate at least one of the following: remaining MCOT information which is used to indicate a remaining MCOT of a COT within which the UE performs uplink transmission, or a target time period, and the target time period is: a time period for allowing a network device to transmit downlink data within COT within which uplink transmission is.

The embodiments of the present application provide a network device. The network device may receive the PUSCH which bears UCI and is transmitted by UE so as to acquire remaining MCOT information which is used to indicate a remaining MCOT of a COT within which the UE performs uplink transmission and/or the target time period (that is, the time period allowing the network device to transmit downlink data within the COT within which uplink transmission is). Since the network device may acquire remaining MCOT information and/or the target time period through the UCI, the network device may share the COT of the UE performing uplink transmission according to the remaining MCOT information and/or the target time period, so that downlink data can be effectively transmitted.

The processor 131 may be responsible for managing a bus architecture and general processing, and may be configured to read and execute programs in the memory 133 to implement processing functions and control on the network device 130. The memory 133 may store data used by the processor 131 when the processor 131 performs an operation. The processor 131 and the memory 133 may be integrated together or disposed separately.

In the embodiments of the present application, the network device 130 may further include: a computer program stored in the memory 133 and capable of running on the processor 131, wherein when the computer program is executed by the processor 131, the steps of the method provided by the embodiments of the present application are implemented.

In FIG. 9, a bus architecture may include any number of interconnected buses and bridges. Specifically, various circuits of one or more processors represented by the processor 131 and a memory represented by the memory 133 are interconnected. The bus architecture may further link various other circuits such as a peripheral device, a voltage regulator, and a power management circuit. These are well known in the art, and therefore are not further described in the embodiments of the present application. A bus interface 135 provides an interface. The transceiver 132 may be a plurality of elements, in other words, include a transmitter and a receiver, and provide a unit for communicating with various other devices on a transmission medium. For different UE, the user interface 134 may be alternatively an interface for externally and internally connecting a required device. The connected device includes, but not limited to: a keypad, a display, a speaker, a microphone, and a joystick.

An embodiment of the present application further provides a computer readable storage medium, where the computer readable storage medium stores a computer program, where the computer program, when executed by the processor 131 shown in FIG. 9, implements the processes of the foregoing method embodiments, and the same technical effects can be achieved. To avoid repetition, details are not described herein again. The computer readable storage medium includes a ROM, a RAM, a magnetic disk, an optical disc, or the like.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present application essentially, or the part contributing to the related technology may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present application.

The embodiments of the present application are described above with reference to the accompanying drawings, but the present application is not limited to the above specific implementations, and the above specific implementations are only illustrative and not restrictive. Under the enlightenment of the present application, those of ordinary skill in the art can make many forms without departing from the purpose of the present application and the protection scope of the claims, all of which fall within the protection of the present application.

The invention claimed is:

1. An information indicating method, performed by a User Equipment (UE), wherein the method comprises:
    sending a Physical Uplink Shared CHannel (PUSCH), wherein the PUSCH bears Uplink Control Information (UCI), the UCI is used to indicate a target time period, wherein the target time period includes: a time period for allowing a network device to transmit downlink data within a Channel Occupancy Time (COT) within which uplink transmission is performed,
    wherein when the UCI is used to indicate the start position of the target time period, the PUSCH is transmitted by the UE on a configured grant resource, and the UCI carried by each PUSCH transmitted on the configured grant resource is further used to indicate an offset time, and the offset time is the time from the end position or the start position of the PUSCH to the start position of the target time period.

2. The method according to claim 1, wherein when the UCI is further used to indicate the remaining Maximum Channel Occupancy Time (MCOT) information which is used to indicate a remaining MCOT of the COT within which the UE performs uplink transmission, and the target time period, the remaining MCOT information comprises any one of the following:
    the number of symbols which start from the end position or the start position of the PUSCH to the end position of the MCOT,
    the number of time units which start from the end position or the start position of the PUSCH to the end position of the MCOT, and the symbol index offset from the end position or the start position of the PUSCH to the end position of the MCOT, or
    the number of time units which start from the end position or the start position of the PUSCH to the end position of the MCOT, and the number of symbols included in a slot where the end position of the MCOT is located in.

3. The method according to claim 2, wherein when the UCI is further used to indicate the remaining MCOT information, the remaining MCOT information comprises the start position of the COT and the length of the MCOT.

4. The method according to claim 3, wherein the UCI comprises Listen-Before-Talk (LBT) priority class information, the LBT priority class information is used to indicate for the UE to acquire the priority class of LBT adopted by the COT, and the priority class of the LBT corresponds to the length of the MCOT.

5. The method according to claim 3, wherein the start position of the COT is indicated through first indication information and second indication information, the first indication information is used to indicate whether the PUSCH is a first PUSCH of the COT, and the second indication information is used to indicate a time length from the end position or the start position of the PUSCH to the start position of the COT.

6. The method according to claim 5, wherein the first indication information indicates whether the PUSCH is the first PUSCH of the COT by the modes by:
   indicating through bit indication information, or
   indicating through the toggle result of toggle bit information, or
   indicating through order sequence of the PUSCH indicated by Uplink Assignment Index (UAI) bit information.

7. The method according to claim 5, wherein the second indication information comprises any one of the following:
   the number of symbols which start from the end position or the start position of the PUSCH to the start position of the COT,
   the number of time units which start from the end position or the start position of the PUSCH to the start position of the COT, and the offset number of the symbol serial number of the end position or the start position of the PUSCH relative to the start position of the COT, or
   the number of time units which start from the end position or the start position of the PUSCH to the start position of the COT, and the number of symbols included in a slot where the start position of the COT is located.

8. The method according to claim 1, wherein the UCI is further used to indicate the number of time units included in the offset time.

9. The method according to claim 1, wherein the LBT type of the network device in the target time period is indicated by the UCI or is predefined.

10. The method according to claim 1, wherein the time length of the target time period is indicated by the UCI, or is predefined, or is configured by Radio Resource Control (RRC).

11. The method according to claim 10, wherein when the time length of the target time period is indicated by the UCI, the UCI is used to indicate the end position of the target time period, or time units of the time length of the target time period and the number of the time units included in the time length.

12. The method according to claim 11, wherein when the UCI is used to indicate the end position of the target time period, the UCI is used to indicate third indication information, and the third indication information comprises any one of the following:

the number of time units which start from the end position or the start position of the PUSCH to the end position of the target time period,
the number of time units which start from the end position or the start position of the PUSCH to the target time period, and the offset number of the symbol serial number of the end position or the start position of the PUSCH relative to the end position of the target time period, or
the number of time units which start from the end position or the start position of the PUSCH to the end position of the target time period, and the number of symbols included in a slot where the end position of the target time period is located.

13. The method according to claim 2, wherein the time units are: slot, millisecond, or the time length of the PUSCH.

14. The method according to claim 1, wherein the UCI is further used to indicate for the UE to support one-time uplink and downlink switch or multi-time uplink and downlink switch within the COT.

15. An information indicating method, performed by a network device, wherein the method comprises:
   receiving a Physical Uplink Shared CHannel (PUSCH), wherein the PUSCH bears Uplink Control Information (UCI), the UCI is used to indicate a target time period,
   wherein the target time period includes: a time period for allowing the network device to transmit downlink data within a Channel Occupancy Time (COT) within which uplink transmission is performed,
   wherein when the UCI is used to indicate the start position of the target time period, the PUSCH is transmitted by a User Equipment (UE) on a configured grant resource, and the UCI carried by each PUSCH transmitted on the configured grant resource is further used to indicate an offset time, and the offset time is the time from the end position or the start position of the PUSCH to the start position of the target time period.

16. The method according to claim 15, wherein when the UCI is further used to indicate remaining Maximum Channel Occupancy Time (MCOT) information which is used to indicate a remaining MCOT of the COT within which the UE performs uplink transmission and the target time period, the remaining MCOT information comprises any one of the following:
   the number of symbols which start from the end position or the start position of the PUSCH to the end position of the MCOT,
   the number of time units which start from the end position or the start position of the PUSCH to the end position of the MCOT, and the offset number of the symbol number of the end position or the start position of the PUSCH relative to the end position of the MCOT, or
   the number of time units which start from the end position or the start position of the PUSCH to the end position of the MCOT and the number of symbols included in a slot where the end position of the MCOT is located.

17. The method according to claim 16, wherein when the UCI further is used to indicate the remaining MCOT information, the remaining MCOT information comprises the start position of the COT and the length of the MCOT.

18. The method according to claim 17, wherein the UCI comprises Listen-Before-Talk (LBT) priority class information, the LBT priority class information is used to indicate for the UE to acquire the priority class of LBT adopted by the COT, and the priority class of the LBT corresponds to the length of the MCOT.

19. A User equipment (UE), comprising a processor, a memory, and a computer program stored in the memory and capable of running on the processor, wherein the computer program, when executed by the processor, causes the processor to perform the information indicating method, wherein the method comprises:

sending a Physical Uplink Shared CHannel (PUSCH), wherein the PUSCH bears Uplink Control Information (UCI), the UCI is used to indicate:

a target time period, wherein the target time period includes: a time period for allowing a network device to transmit downlink data within a Channel Occupancy Time (COT) within which uplink transmission is performed, wherein when the UCI is used to indicate the start position of the target time period, the PUSCH is transmitted by the UE on a configured grant resource, and the UCI carried b each PUSCH transmitted on the configured grant resource is further used to indicate an offset time, and the offset time is the time from the end position or the start position of the PUSCH to the start position of the target time period.

20. The UE according to claim 19, wherein when the UCI is used to indicate remaining Maximum Channel Occupancy, Time (MCOT) information which is used to indicate a remaining MCOT of the COT within which the UE performs uplink transmission, and the target time period, the remaining MCOT information comprises any one of the following:

the number of symbols which start from the end position or the start position of the PUSCH to the end position of the MCOT, the number of time units which start from the end position or the start position of the PUSCH to the end position of the MCOT, and the symbol index offset from the end position or the start position of the PUSCH to the end position of the MCOT, or the number of time units which start from the end position or the start position of the PUSCH to the end position of the MCOT, and the number of symbols included in a slot where the end position of the MCOT is located in.

\* \* \* \* \*